United States Patent [19]

Tocha

[11] 4,174,619
[45] Nov. 20, 1979

[54] APPARATUS FOR CONTROLLING THE PRESSURE OF A GAS IN A GAS LINE

[75] Inventor: Klaus Tocha, Langenfeld, Fed. Rep. of Germany

[73] Assignee: Messer Griesheim GmbH, Frankfurt am Main, Fed. Rep. of Germany

[21] Appl. No.: 876,891

[22] Filed: Feb. 13, 1978

[30] Foreign Application Priority Data

Feb. 16, 1977 [DE] Fed. Rep. of Germany ....... 2706484

[51] Int. Cl.² .................................................. F17C 7/02
[52] U.S. Cl. .......................................... 62/52; 62/55
[58] Field of Search .............. 62/52, 53, 55, 45, 514 R

[56] References Cited

U.S. PATENT DOCUMENTS

| | | | |
|---|---|---|---|
| 2,964,919 | 12/1960 | Howlett | 62/55 |
| 3,091,096 | 5/1963 | Rendos et al. | 62/52 |
| 3,121,999 | 2/1964 | Kasbohm et al. | 62/50 |
| 3,541,803 | 11/1970 | Young | 62/45 |
| 3,690,115 | 9/1972 | Clayton | 62/55 |

*Primary Examiner*—Ronald C. Capossela
*Attorney, Agent, or Firm*—Ernest F. Marmorek

[57] ABSTRACT

An apparatus for controlling the pressure of a gas in a gas line includes a source of liquefied gas maintained at a prearranged gas pressure, an evaporation-inducing device connected to the source of liquefied gas and to the gas line, and a self-actuating valve disposed in the feed line for releasing a gas stream from the source of liquefied gas upon a predetermined pressure in the gas line falling below a prearranged pressure in the source of the liquefied gas, less a pressure loss in the feed line, so that the pressure in the gas line is substantially maintained at the predetermined pressure.

8 Claims, 2 Drawing Figures

APPARATUS FOR CONTROLLING THE PRESSURE OF A GAS IN A GAS LINE

BACKGROUUND OF THE INVENTION

The present invention relates to an apparatus for controlling or smoothing gas pulsation in a conduit for evaporating liquefied gases having a low boiling point and comprises substantially an insulated container holding the liquefied gas, and evaporation-inducing means connected to the container.

The liquefied gas is evaporated in the evaporation-inducing means heat being supplied to the evaporation-inducing means. Evaporation results due to a variety of causes, for example, a non-uniform convection stream within the evaporation-inducing means, resulting in turn in pressure fluctuations within a consumer's network. Pressure fluctuations of this type disturb the consumer significantly. Such pressure fluctuations represent a significant portion of the system pressure, particularly if low system pressures are used, so that regulation or control of the pressure is made more difficult.

SUMMARY OF THE INVENTION

It is accordingly one of the principal objects of the present invention to devise an apparatus which prevents any pressure fluctuations in the network or supply system of a consumer caused by any non-uniform evaporation.

Accordingly, the apparatus for controlling the pressure of a gas in a gas line, a predetermined pressure prevailing in the gas line, includes a conduit, and the conduit comprises in combination a source of liquefied gas maintained at a prearranged gas pressure, evaporation-inducing means connected to the source of liquefied gas, and to the gas line for evaporating the liquefied gas, and for generating a gas flow to the gas line, pressure fluctuations occurring in the gas flow, a feed line connecting the source of liquefied gas to the gas line, wherein the source of liquefied gas is maintained at a prearranged pressure, and a predetermined pressure loss occurs in the feed line, and self-actuating valve means disposed in the feed line for releasing a gas stream from the source of liquefied gas upon the predetermined pressure in the gas line falling below the prearranged pressure, less the pressure loss in the feed line, so that the pressure in the gas line is substantially maintained at a predetermined pressure, and insulated from pressure fluctuations in the gas flow.

The apparatus preferably includes a relief valve connected in the feed line.

The liquefied gas has preferably a low boiling point, and the valve means preferably includes a relief valve.

The source of liquefied gas preferably includes an insulated container having the liquefied gas stored therein, and a supply feed connecting the insulated container to the evaporation-inducing means.

A second relief valve is advantageously connected within the supply feed, and the insulated container advantageously has an outlet and an inlet, and includes a feedback means for controllably feeding gas from the outlet to the inlet of the insulated container.

It is advantageous if the feedback means further includes additional evaporating means, and a third relief valve is disposed downstream of the additional evaporating means.

It is advantageous if the prearranged gas pressure exceeds the predetermined pressure.

The valve means may also be an electrically or pneumatically controlled valve, or a control circuit having a control valve, or a pressure sensor, including a nominal pressure indicator and a control circuit.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENTS

Figure 1:
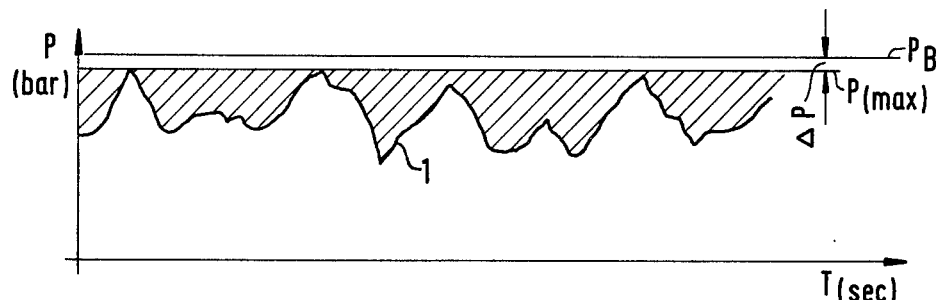
FIG. 1 is a diagram indicating pressure fluctuations in a supply line.

In carrying out the invention, there is shown in FIG. 1, a graph 1, illustrating pressure fluctuations as a function of time. The maximal pressure occurring is shown as $p_{max}$. In FIG. 1, there is also shown a constant pressure $p_b$ in a gas chamber of an insulated container 2. The apparatus shown in FIG. 2 is adjusted, so that the pressure $p_b$ exceeds the pressure $p_{max}$ by an amount $\Delta p$.

Figure 2:
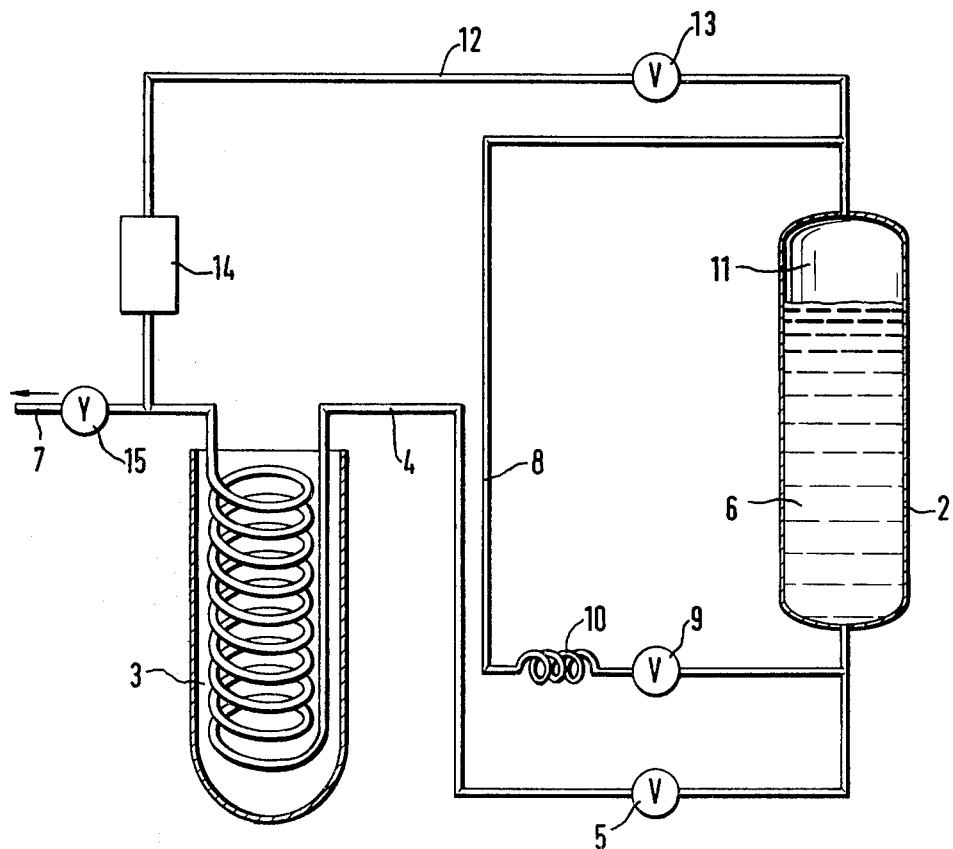
FIG. 2 is an apparatus for controlling the pressure of a gas in a gas line, according to the present invention.

The apparatus shown in FIG. 2 thus includes an insulated container 2 containing liquefied gas, and evaporation-inducing means 3. An inlet 4 of the evaporation-inducing means 3 includes a valve 5, the inlet 4 of the evaporation-inducing means being connected to the fluid-containing portion 6 of the insulated container 2. A gas line 7, being the outlet of the evaporation-inducing means 3, is provided with a valve 15. The fluid-holding chamber 6 of the insulated container 2 is connected through a feed line 8 with a gas chamber 11 of the insulated container 2. A valve 9 and additional evaporation-inducing means 10 are disposed within the feed line 8. If necessary, additional nitrogen can be evaporated by means of the additional evaporation-inducing means 10, and then supplied to the gas chamber 11.

The gas chamber 11 is connected by means of a feed line 12 to the gas line 7. A relief valve 13 and a self-actuating valve 14 are also disposed within the feed line 12.

The apparatus, according to the present invention, operates as follows:

Valves 5 and 15 disposed respectively upstream and downstream of the evaporation-inducing means 3, and a pressure in the insulated container 2, are adjusted so that the desired system pressure is obtained downstream of the evaporation-inducing means 3; the pressure in the gas line 7, downstream of the evaporation means 3, then corresponds to the peak pressure valve $p_{max}$.

As the result of a pressure loss occurring in the feed line 12, the pressure in the gas chamber 11 of the container 2 is higher by an amount $\Delta p$, than the pressure $p_{max}$. An optimum damping of the pulsations occurs if the pressure loss of the relief valve 14 corresponds exactly to the amount $\Delta p$. This can be achieved by the construction or design of the self-actuating valve 14. Under those conditions, the valve 14 is more or less opened at all pressures which are equal to, or smaller than $p_{max}$. This is shown in FIG. 1. The pressure flucutations are then equalized, and any pressure below the peak pressure $p_{max}$ is made up by the pressure from the gas chamber 11.

The apparatus operates also if the pressure loss across the relief valve 14 exceeds the amount $\Delta p$, but the peak pressures are then transmitted in attenuated form as pulsations to the gas line 7, and therefrom to the container. But even if the apparatus is not optimally adjusted, the pulsations occurring are smoothed considerably by the apparatus according to the invention.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An apparatus for controlling the pressure of a gas in a gas line, a predetermined pressure prevailing in said gas line, comprising a conduit, said conduit including in combination:
   an insulated container,
   a source of gas having a relatively low boiling point and being maintained at a prearranged gas pressure within said container, a portion of said gas being in said container in liquefied form, the remaining gas portion being in gaseous form and occupying a gas space within said container,
   evaporation-inducing means connected to said portion of gas in liquefied form, and to said gas line, for evaporating said gas in liquefied form, and for generating a gas flow to said gas line, pressure fluctuations occurring in said gas flow,
   a feed line disposed in parallel with said evaporation-inducing means and connecting said gas space to said gas line, said gas space being maintained at a prearranged pressure, and a predetermined pressure loss occurring in said feed line, and
   self-actuating valve means disposed in said feed line for releasing a gas stream from said gas space upon the predetermined pressure in said gas line falling below said prearranged pressure less said pressure loss, whereby the pressure in said gas line is substantially maintained at said predetermined pressure, and insulated from pressure fluctuations in said gas flow.

2. An apparatus according to claim 1, further comprising a relief valve connected within said feed line.

3. An apparatus according to claim 1, wherein said valve means includes a relief valve.

4. An apparatus according to claim 1, further comprising a supply feed connecting said insulated container to said evaporation-inducing means.

5. An apparatus according to claim 4, further comprising a second relief valve connected within said supply feed.

6. An apparatus according to claim 1, further comprising feedback means for controllably feeding gas from said gas in liquefied form to said gas space of said insulated container.

7. An apparatus according to claim 6, wherein said feedback means further comprises additional evaporating means and a third relief valve disposed downstream of said additional evaporating means.

8. An apparatus according to claim 1, wherein said prearranged gas pressure exceeds said predetermined pressure.

* * * * *